United States Patent
Kindlimann et al.

[15] 3,672,037
[45] June 27, 1972

[54] NITRIDE STRENGTHENED STAINLESS STEEL COMPOSITE AND PRODUCTION THEREOF

[72] Inventors: Lynn E. Kindlimann, Natrona Heights; Alexander B. Greene, New Kensington, both of Pa.

[73] Assignee: Allegheny Ludlum Steel Corporation, Pittsburgh, Pa.

[22] Filed: Feb. 28, 1969

[21] Appl. No.: 803,442

[52] U.S. Cl..............................................29/497.5, 29/504
[51] Int. Cl.................................................B23k 31/02
[58] Field of Search................29/487, 196, 497.5, 504; 148/16.6, 12.1

[56] References Cited

UNITED STATES PATENTS

| | | | |
|---|---|---|---|
| 3,393,445 | 7/1968 | Ulam | 29/497.5 X |
| 2,300,274 | 10/1942 | Dahl | 148/16.6 |
| 3,270,412 | 9/1966 | Vordahl | 29/487 X |

OTHER PUBLICATIONS

Cher, Franklin P., " Dispersion Strengthening of Iron Alloys By Internal Nitriding," Rensselaer Polytechnic Institute, Ph.D., 1965, pp. ix–x.

Vincent F. Malcolm, " Surface Hardened Stainless Steels," Product Engineering, January, 1949, pp. 84–87.

*Primary Examiner*—John F. Campbell
*Assistant Examiner*—Ronald J. Shore
*Attorney*—Richard S. Speer and Vincent G. Gioia

[57] ABSTRACT

The application describes composite members containing a plurality of layers at least one of which is nitride strengthened stainless steel and a pressure bonding method for producing them.

9 Claims, No Drawings

NITRIDE STRENGTHENED STAINLESS STEEL COMPOSITE AND PRODUCTION THEREOF

The present invention relates to a composite member and to a process for producing it and more particularly to a nitride-strengthened, stainless steel composite member and to a process for producing it.

A method for producing a nitride-strengthened stainless steel is described in U.S. Pat. Application Ser. No. 735,186 filed on June 7, 1968 and now abandoned. According to it, austenitic stainless steel members containing a metal component such as titanium, aluminum, vanadium or columbium, preferably titanium, which is capable of forming a nitride having a free energy of formation greater than about −21,000 cal/mole are internally nitrided at an elevated temperature through diffusion of nitrogen. The metal component is present in an amount sufficient to provide, after nitriding, nitride particles as a dispersoid in said steel with an interparticle spacing of less than about 10 microns, preferably less than about 2 microns. This is important since the strength of the nitrided steel increases as the interparticle spacing decreases.

Although the improvement in strength realized from the method is very impressive with relatively thin members, i.e. members less than about 10 mils thick, it decreases as the thickness of the members increases. Thicker members generally require higher temperatures and/or longer times for diffusion of nitrogen throughout the member. Longer times are detrimental to the steel's strength as they are accompanied by larger interparticle spacings due to growth of the nitride particles. Likewise, higher temperatures are detrimental to the steel's strength since they are also accompanied by larger interparticle spacings because less nitride particles are nucleated at higher temperatures. However, the benefits of shorter times and lower temperatures must be balanced since nitriding proceeds slower at lower temperatures.

Until recently the full value of nitride-strengthened, stainless steel foil sheets could not be realized as many applications required thicker sections. This problem no longer exists as we have developed a thicker nitrided member, i.e. greater than 10 mils, having an increase in strength similar to that realized from relatively thin nitrided members. This thicker nitrided member is a composite produced by pressure bonding relatively thin nitrided members together. We have also developed composite members with at least one layer of nitrided material and at least one layer of dissimilar material chosen so as to produce a composite tailored for specific applications. These composites are likewise produced by pressure bonding.

It is accordingly an object of this invention to provide a composite member containing nitride-strengthened, stainless steel.

It is another object of this invention to provide a composite member containing nitride-strengthened, stainless steel and a dissimilar material.

It is an additional object of this invention to provide a process for producing a composite member containing nitride-strengthened, stainless steel.

It is a further object of this invention to provide a process for producing a composite member containing nitride-strengthened, stainless steel and a dissimilar material.

Formation of the pressure bond of this invention is dependent upon pressure and heat. Typical ways of applying the pressure include roll stands, platens and explosives. The heat can be supplied by external means or can be produced by the very means which supply the pressure, i.e. explosives generate heat at the bonding interface. Typical ways of supplying heat externally include furnaces, resistance heating and lasers. Control must be exercised with regard to the maximum temperatures and pressures applied so as to maintain good strength, at least about 8ksi at 2,000° F. If temperature becomes excessive the nitride particles grow and interparticle spacing increases and if pressure becomes excessive particle growth rates increase at elevated temperatures and nitrides tend to break away from the matrix at lower temperatures.

Under most circumstances it is preferable to clean the members being bonded so as to remove surface oxides. Cleaning can be chemical, e.g. pickling, or mechanical, e.g. scratch brushing. Additionally, it is preferable to bond in a non-oxidizing atmosphere such as a vacuum, inert gas, e.g. argon, or reducing gas, e.g. hydrogen.

The final size of the composite of this invention is limited only by the capabilities of the pressing and handling equipment. It can be comprised of two or more layers of nitride-strengthened, stainless steel or can comprise at least one layer of nitride-strengthened, stainless steel bonded to one or more dissimilar layers so as to produce composites tailored for specific applications. Illustrative, dissimilar materials are precipitation hardening alloys, e.g. 54% Ni, 19% Cr, 11% Co, 10% Mo, 3% Ti, 1.5% Al and residuals, and corrosion or oxidation resistant alloys, e.g. 47% Ni, 22% Cr, 20% Fe, 9% Mo and residuals. Composites comprising precipitation hardening alloys are stronger up to about 1,500° F than composites consisting of only nitride-strengthened, stainless steel because the precipitation hardening material responds to age hardening. They also maintain a significant amount of strength at higher temperatures due to the nitride dispersoids. In forming the composites of this invention it is desirable to choose materials of similar thermal expansion characteristics so as not to raise severe stresses which could rupture the bonds during heating and cooling.

Hot roll bonding is one specific way to form the bond of this invention. It generally comprises rolling the members to be joined at a temperature in excess of 1,600° F thereby forming a diffused metallurgical bond. Lower temperatures, however, are usable so long as the maximum rolling pressure is controlled. A preferred temperature range is 1,800° F - 2,200° F. Although members have been joined with good strength retention at temperatures as high as 2,400° F, bonding at this temperature is not preferable since the rate of particle growth increases rapidly with temperature.

The following examples are illustrative of several embodiments of the invention. Nitride-strengthened, austenitic stainless steel members having the compositions set out below in Table I and the properties set out below in Table II were pickled to remove surface oxides and superimposed upon like members.

TABLE I

| Superimposed members | Composition | | | | | | | | | |
|---|---|---|---|---|---|---|---|---|---|---|
| | Cr | Ni | Ti | C | Mn | Si | Mo | V | B | Fe |
| A | 18.0 | 12.0 | 2.0 | 0.003 | 0.5 | 0.75 | | | | Bal. |
| B | 18.0 | 12.0 | 2.0 | 0.003 | 0.5 | 0.75 | | | | Bal. |
| C | 14.75 | 25.5 | 2.08 | 0.055 | 1.25 | 0.70 | 1.25 | 0.25 | 0.006 | Bal. |
| D | 14.75 | 25.5 | 2.08 | 0.055 | 1.25 | 0.70 | 1.25 | 0.25 | 0.006 | Bal. |
| E | 24.9 | 31.9 | 1.99 | 0.004 | 0.53 | 2.0 | | | | Bal. |

TABLE II

| Superimposed Members | Initial Thickness (Mils) | Average Initial Interparticle Nitride Spacing (microns) | Initial U.T.S. at 2000°F (ksi) |
|---|---|---|---|
| A | 5–6 | 0.1 | 24.2[a] |
| B | 5–6 | 0.1 | 24.2[a] |

| | | | |
|---|---|---|---|
| C | 5–6 | 0.2 | 17.9 (a) |
| D | 5–6 | 0.2 | 17.9 (a) |
| E | 5–6 | 0.5 | — |

(a) Instron Tensile Test

They were then enclosed within a plain carbon steel pack. This was accomplished by welding carbon steel completely around the members with an exhaust tube welded into one end for evacuation of air. The pack was then evacuated, soaked in a furnace until the desired hot rolling temperature was attained and hot rolled.

Found below in Table III are the hot rolling temperatures and the percentage hot reductions as well as the ultimate tensile strengths at 2,000° F and final interparticle nitride spacings of the composite members. Comparisons between them are in order since they were all nitrided at 1,900° F under identical conditions. For proper analysis it should be kept in mind that two different tensile tests were used. Some members underwent the Instron Tensile Test while others underwent the Gleeble Tensile Test which produces readings about 20 percent higher than the Instron Test.

TABLE III

| Composite Members | Hot Rolling Temp. (°F) | % Hot Reduction | Final U.T.S. at 2000°F (ksi) | Average Final Interparticle Nitride Spacing (microns) |
|---|---|---|---|---|
| A | 2100 | 90 | 14.1 (a) | 0.27 |
| B | 2200 | 50 | 21.7 (b) | 0.20 |
| C | 2400 | 40 | 16.7 (b) | — |
| D | 2200 | 50 | 17.5 (b) | — |
| E | 2200 | 50 | 15.6 (b) | — |

(a) Instron Tensile Test
(b) Gleeble Tensile Test

From the table it is readily seen that all the composite members possessed good high temperature strength properties, ultimate tensile strengths in excess of 8 ksi at 2,000° F. However, it is noted that member E had a lower strength than member D and member D had a lower strength than member B even though they were all bonded under identical conditions. This is because E contained more nickel than D which contained more nickel than B and, since nickel lowers the nitriding rate, higher nickel members have lower nitriding rates and produce nitride strengthened steels with greater interparticle spacings and lower strengths. It is additionally noted that although member C exhibited good strength its strength was not as high as that shown by member D. This is because C was bonded at a higher temperature than D, thus inducing somewhat more growth of the nitride particles at the expense of a desirable small interparticle spacing. In fact it is this type of growth which causes all the composite members to have lower strengths than the nonbonded superimposed members. A final comparison shows member B with greater strength and smaller nitride spacing than member A although member B was bonded at a higher temperature. This is because member A was reduced to a greater degree than member B through additional roll passes and hence was at an elevated temperature for a longer time than B, thus causing further nitride growth.

The examples set out above should be construed as exemplary only and in no way limiting. Although it is preferable to remove oxides prior to bonding and to use a non-oxidizing atmosphere during bonding it is not necessary to do so. In spite of the fact that a pack was used to maintain a vacuum during heating and rolling a controlled atmosphere furnace and roll stand could serve the same purpose. Additionally, both ferritic and austenitic nitride strengthened stainless steels could be bonded. Furthermore, the concept of applying pressure through rolling is only one aspect of the invention. Pressure could be applied in equally as effective a manner in any number of ways such as through the application of platens and explosives. Explosives are particularly desirable insofar as they obviate the need for any external heating.

It will be apparent to those skilled in the art that the novel principles of the invention disclosed herein in connection with specific examples thereof will suggest various other modifications and applications of the same. It is accordingly desired that in construing the breadth of the appended claims they shall not be limited to the specific examples of the invention described herein.

We claim:

1. A method of roll pressure bonding at least two members so as to form a composite, comprising the following steps:
   a. providing a member consisting essentially of a nitride-strengthened, stainless steel containing as a dispersoid therein particles of a metal nitride present at an interparticle spacing of less than about 10 microns and having a free energy of formation of greater than about −21,000 cal/mole;
   b. providing at least one additional metallic member;
   c. superimposing the members;
   d. heating the members to a temperature in excess of 1,600° F.; and
   e. roll pressure bonding the members.

2. A method according to claim 1 wherein said members are heated to a temperature of from about 1,800° to about 2,200°F.

3. A method according to claim 1 wherein said members are subjected to a non-oxidizing atmosphere during the application of pressure and heat.

4. A method according to claim 1 wherein said nitride-strengthened, stainless steel is less than 10 mils thick.

5. A method according to claim 1 wherein said additional member consists essentially of a nitride-strengthened, stainless steel containing as a dispersoid therein particles of a metal nitride present at an interparticle spacing of less than about 10 microns and having a free energy of formation of greater than about −21,000 cal/mole.

6. A method according to claim 1 wherein said additional member consists essentially of a precipitation hardening alloy.

7. A method according to claim 1 wherein said additional member consists essentially of a corrosion resistant alloy.

8. A method according to claim 1 wherein said additional member consists essentially of an oxidation resistant alloy.

9. A method of roll pressure bonding at least two members so as to form a composite having a strength of at least 8 ksi at 2,000° F comprising the following steps:
   a. providing at least two members consisting essentially of nitride-strengthened, stainless steel containing as a dispersoid therein particles of titanium nitride present at an interparticle spacing of less than about 2 microns;
   b. superimposing the members; and
   c. heating the members to a temperature in excess of 1,600°F.; and
   d. roll pressure bonding the members.

* * * * *